(12) United States Patent
Chang et al.

(10) Patent No.: US 10,816,326 B2
(45) Date of Patent: Oct. 27, 2020

(54) POLARIZATION MAINTAINING FIBER ARRAY WITH INCREASED POLARIZATION EXTINCTION RATIO AND METHOD OF MAKING

(71) Applicant: ALLIANCE FIBER OPTIC PRODUCTS, INC., Sunnyvale, CA (US)

(72) Inventors: Chia-Hang Chang, New Taipei (TW); Ximao Feng, San Mateo, CA (US); Wen-Lung Kuang, Taoyuan (TW); Andy Fenglei Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 16/559,717

(22) Filed: Sep. 4, 2019

(65) Prior Publication Data
US 2020/0096324 A1    Mar. 26, 2020

Related U.S. Application Data

(60) Provisional application No. 62/734,629, filed on Sep. 21, 2018.

(51) Int. Cl.
| | |
|---|---|
| *G02F 1/295* | (2006.01) |
| *G01B 11/16* | (2006.01) |
| *G01B 11/26* | (2006.01) |
| *G01B 11/22* | (2006.01) |

(52) U.S. Cl.
CPC ............ *G01B 11/168* (2013.01); *G01B 11/22* (2013.01); *G01B 11/26* (2013.01)

(58) Field of Classification Search
CPC ....... G02F 1/295; G01B 11/168; G01B 11/22; G01B 11/26
See application file for complete search history.

(56) References Cited

U.S. PATENT DOCUMENTS

| | | | |
|---|---|---|---|
| 7,483,601 B2 * | 1/2009 | Ma ..................... | G02B 6/274 385/16 |
| 2013/0170789 A1 * | 7/2013 | Kuang ................ | G02B 6/3664 385/14 |

FOREIGN PATENT DOCUMENTS

KR          201607181 A      6/2016

* cited by examiner

*Primary Examiner* — Jennifer Doan
(74) *Attorney, Agent, or Firm* — Grant A. Gildehaus

(57) ABSTRACT

A polarization maintaining fiber array includes a substrate, a cover, and at least two polarization maintaining optical fibers. The substrate includes at least two main grooves, a first additional groove, and a second additional groove, wherein the main grooves are positioned between the first additional groove and the second additional groove. The fiber array includes at least two polarization maintaining optical fibers positioned in the at least two main grooves, a first dummy fiber positioned in the first additional groove, and a second dummy fiber positioned in the second additional groove. The cover is positioned such that it contacts the polarization maintaining optical fibers, the first dummy fiber, and the second dummy fiber.

22 Claims, 6 Drawing Sheets

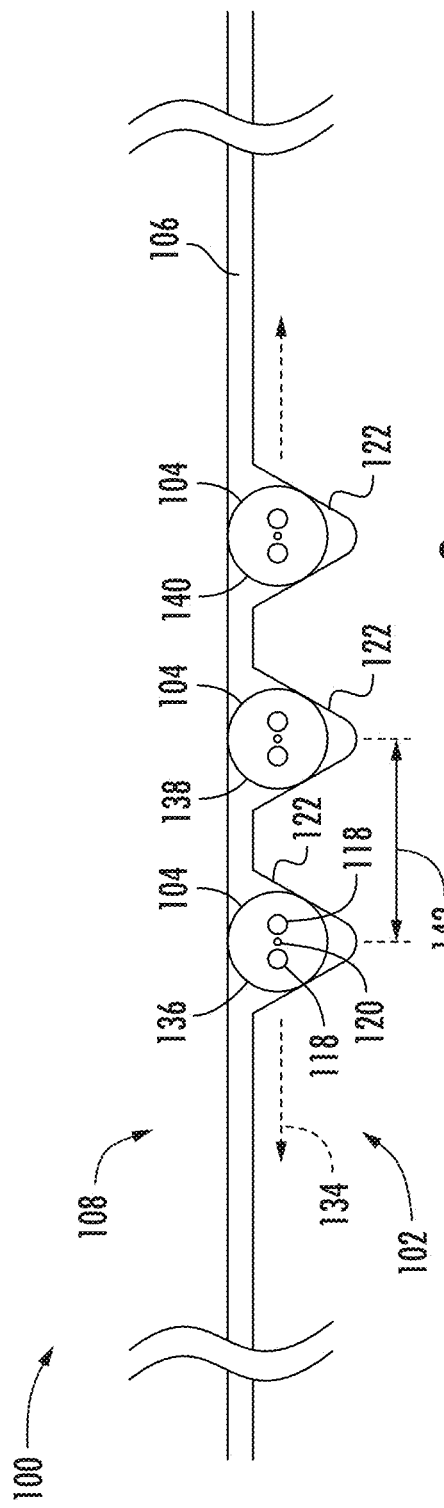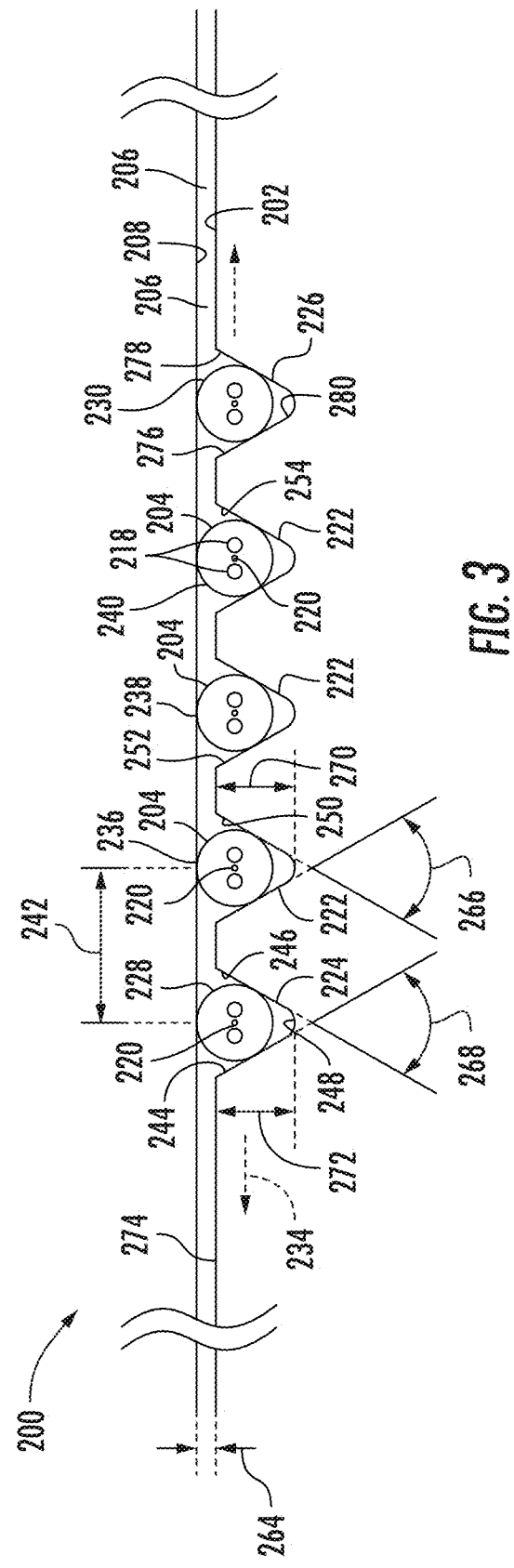

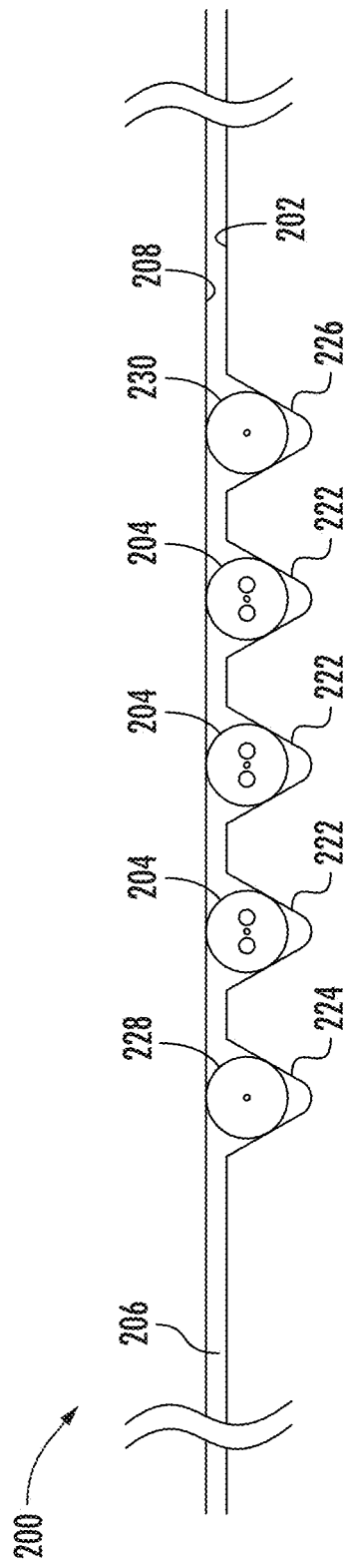
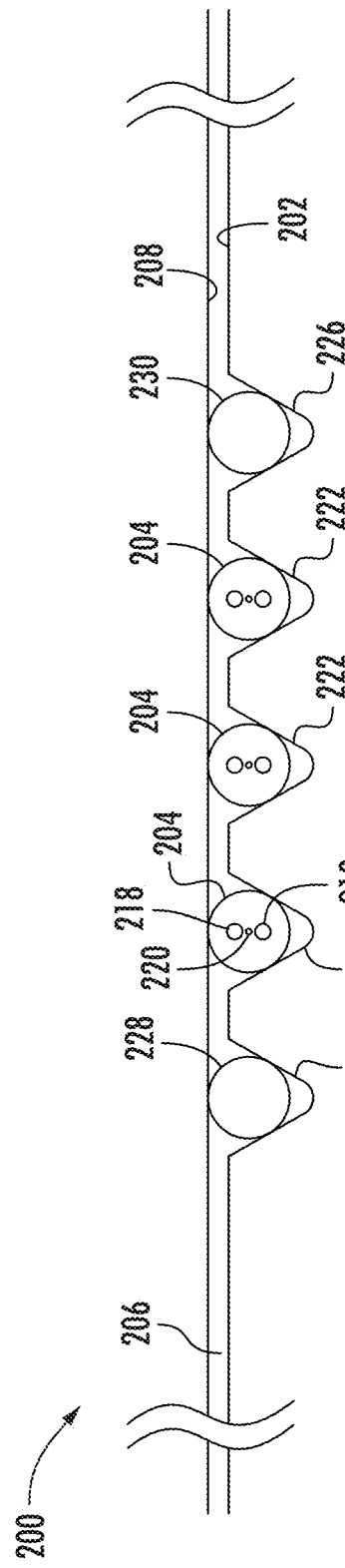

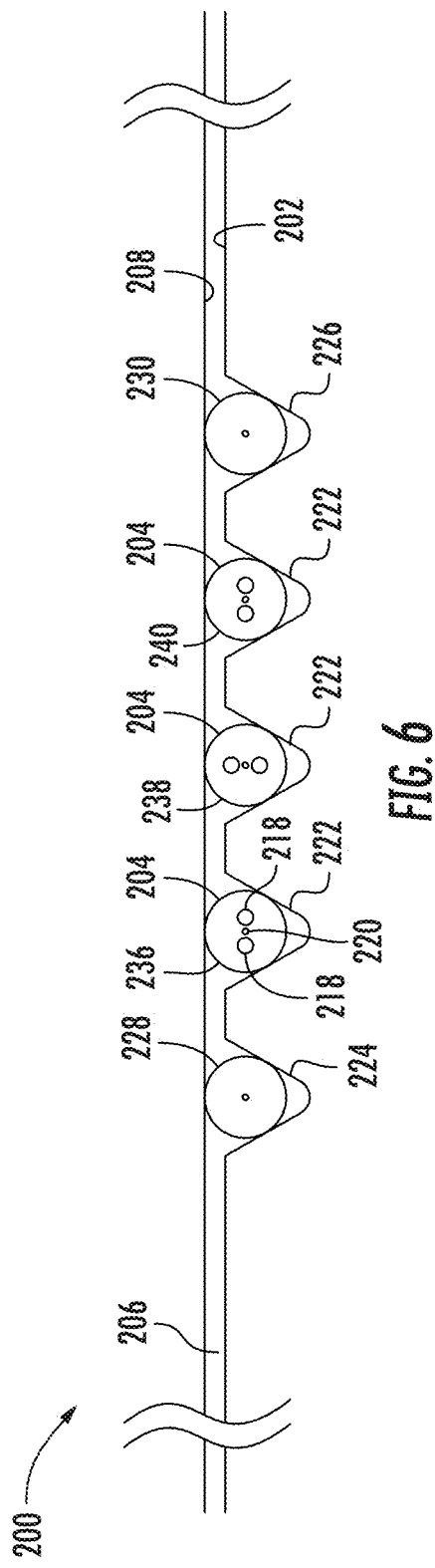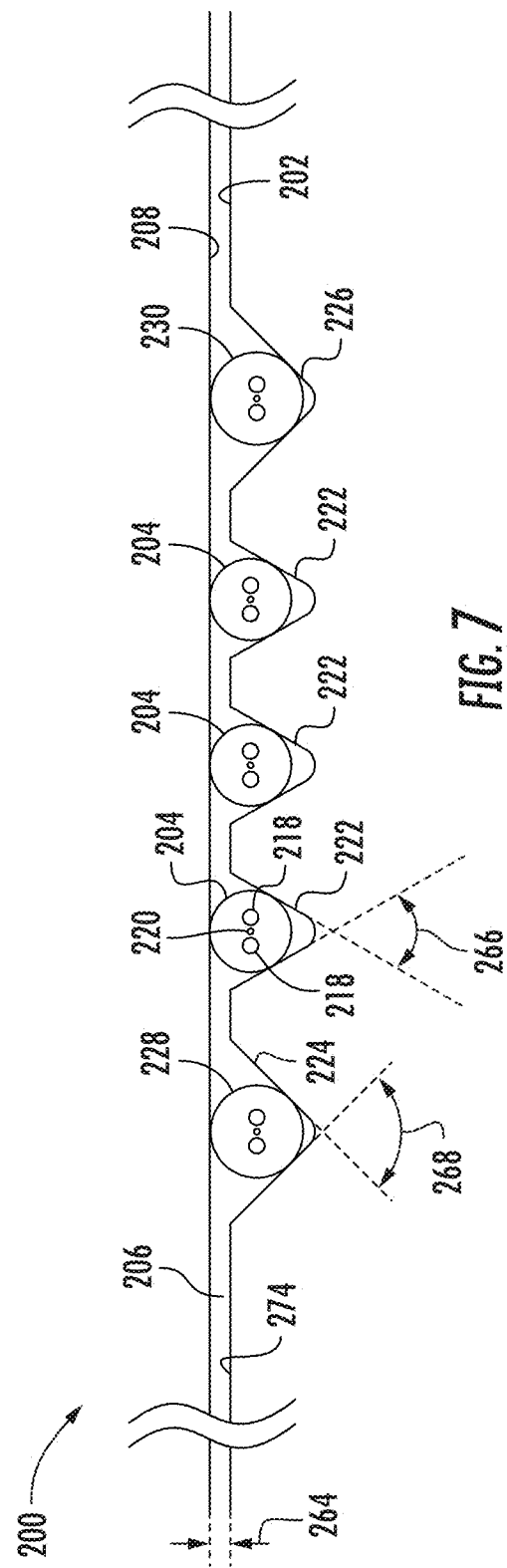

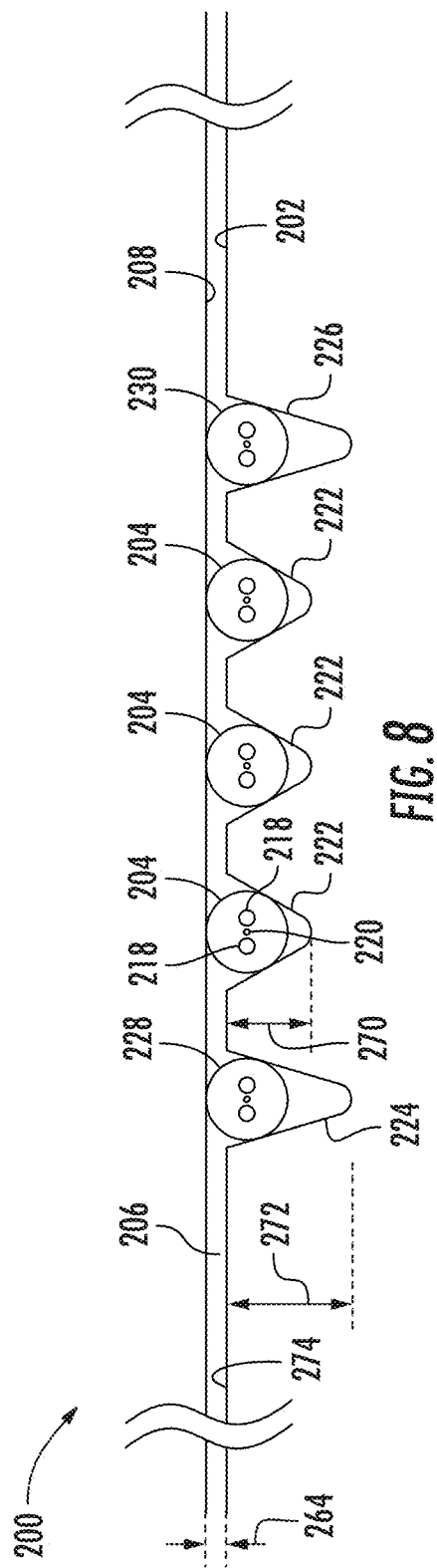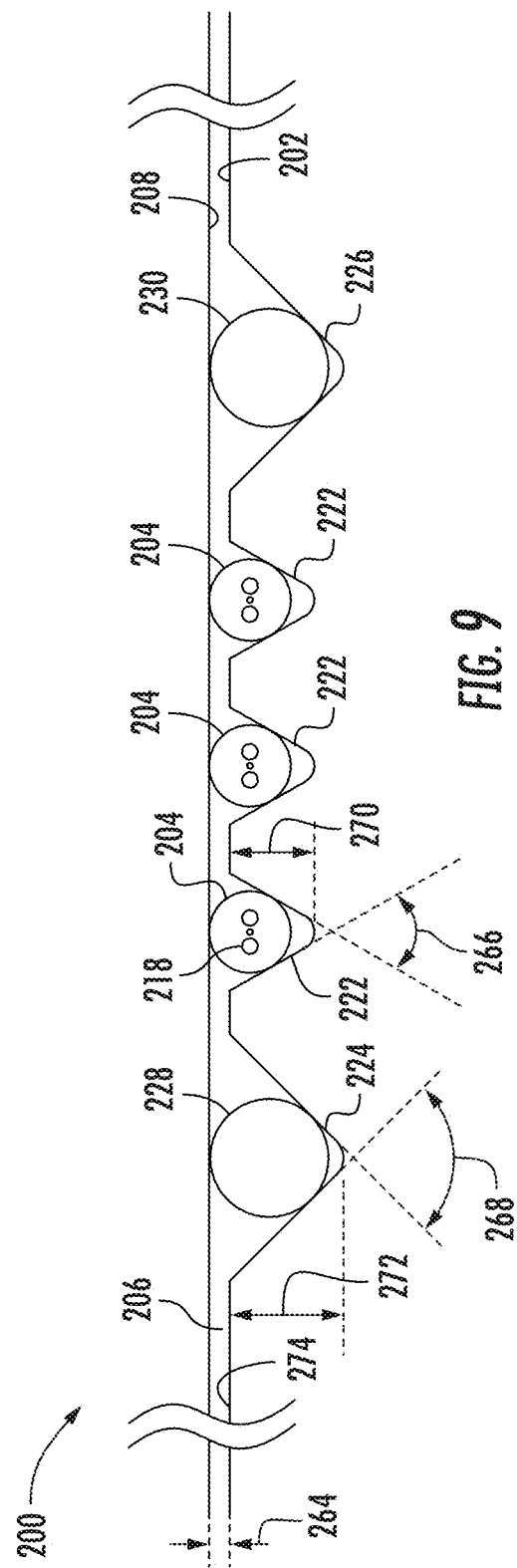

POLARIZATION MAINTAINING FIBER ARRAY WITH INCREASED POLARIZATION EXTINCTION RATIO AND METHOD OF MAKING

PRIORITY APPLICATION

This application claims the benefit of priority of U.S. Provisional Application No. 62/734,629, filed on Sep. 21, 2018, the content of which is relied upon and incorporated herein by reference in its entirety.

FIELD

The present disclosure relates to fiber arrays, and in particular to polarization maintaining (PM) fiber arrays with increased polarization extinction ration (PER).

BACKGROUND

Polarization maintaining fibers are used in a variety of applications that require linearly polarized light propagation. In applications where multiple fiber optic signals and/or optical fibers are needed, a polarization maintaining fiber array (also called a polarization maintaining fiber array unit) including a plurality of polarization maintaining fibers may be used. Polarization maintaining fiber arrays are used, for example, in polarization maintaining photonic waveguide devices, planar splitters, and integrated fiber optic components.

A polarization maintaining fiber array may include two or more polarization maintaining fibers whose polarization axes are aligned with each other. In order to align the polarization axes of two or more polarization maintaining fibers in a polarization maintaining fiber array, the fibers must maintain alignment during assembly and the remainder of the manufacturing process. Maintaining the alignment of the polarization maintaining fibers through the manufacturing process can be a challenging part of the process and, as a result, it may be difficult to accomplish the desired output tolerances for polarization maintaining fiber arrays. In some cases, slight misalignment between the polarization maintaining fibers of a polarization maintaining fiber array may cause decreased the polarization extinction ratio (PER) of the polarization maintaining fibers to the point that the fiber array is no longer useful for a particular application. In general, a high PER for a polarization maintaining optical fiber used in telecommunications and data center applications is considered to be 30 dB or greater.

SUMMARY

An embodiment of the disclosure is a polarization maintaining fiber array that includes a substrate having at least two main grooves, a first additional groove, and a second additional groove. The main grooves are positioned between the first additional groove and the second additional groove. The polarization maintaining fiber array also includes at least two polarization-maintaining optical fibers positioned in the at least two main grooves, a first dummy fiber positioned in the first additional groove, and a second dummy fiber positioned in the second additional groove. A cover is also included which is positioned such that the cover contacts the polarization maintaining optical fibers, the first dummy fiber, and the second dummy fiber.

Also disclosed is a method of manufacturing a polarization maintaining fiber array. The method includes positioning at least two polarization-maintaining optical fibers in at least two main grooves of a substrate, positioning a first dummy fiber in a first additional groove of the substrate, and positioning a second dummy fiber in a second additional groove of the substrate. The main grooves are located between the first additional groove and the second additional groove. The method also includes positioning a cover in contact with the polarization maintaining optical fibers, the first dummy fiber, and the second dummy fiber.

In another embodiment, a polarization maintaining fiber array includes a substrate having at least two main grooves, a first additional groove, and a second additional groove. The main grooves are positioned between the first additional groove and the second additional groove. The polarization maintaining fiber array also includes at least two polarization-maintaining optical fibers positioned in the at least two main grooves, a first dummy fiber positioned in the first additional groove, and a second dummy fiber positioned in the second additional groove. A cover is also included which is positioned in contact with the polarization maintaining optical fibers, the first dummy fiber, and the second dummy fiber. The PER of the polarization maintaining optical fibers is greater than or equal to about 27 dB.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide further understanding of the disclosure, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which:

FIG. 2 is a schematic end view of the polarization maintaining fiber array of FIG. 1.

FIG. 3 is a schematic end view of an example embodiment of a polarization maintaining fiber array having increased PER in accordance with this disclosure.

FIG. 4 is a schematic side view of another example embodiment of a polarization maintaining fiber array with increased PER.

FIG. 5 is a schematic side view of yet another example embodiment of a polarization maintaining fiber array with increase PER.

FIG. 6 is a schematic side view of an additional example embodiment of a polarization maintaining fiber array with increase PER.

FIG. 7 is a schematic side view of another example embodiment of a polarization maintaining fiber array with increase PER.

FIG. 8 is a schematic side view of yet another example embodiment of a polarization maintaining fiber array with increase PER.

FIG. 9 is a schematic side view of an additional example embodiment of a polarization maintaining fiber array with increase PER.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Relative terms like top, bottom, side, horizontal, vertical, etc. are used for convenience and ease of explanation and are not intended to be limiting as to direction or orientation.

The various values for fiber-related parameters discussed herein such as polarization extinction ratio (PER), fiber pitch, etc., are provided as nominal values and it will be understood that deviations from the nominal values provided based on normal manufacturing tolerances and fabrication shortcomings can result in slight variations from the stated nominal values, e.g., to within 1% or 2%, depending on the particular application.

Figure 1:
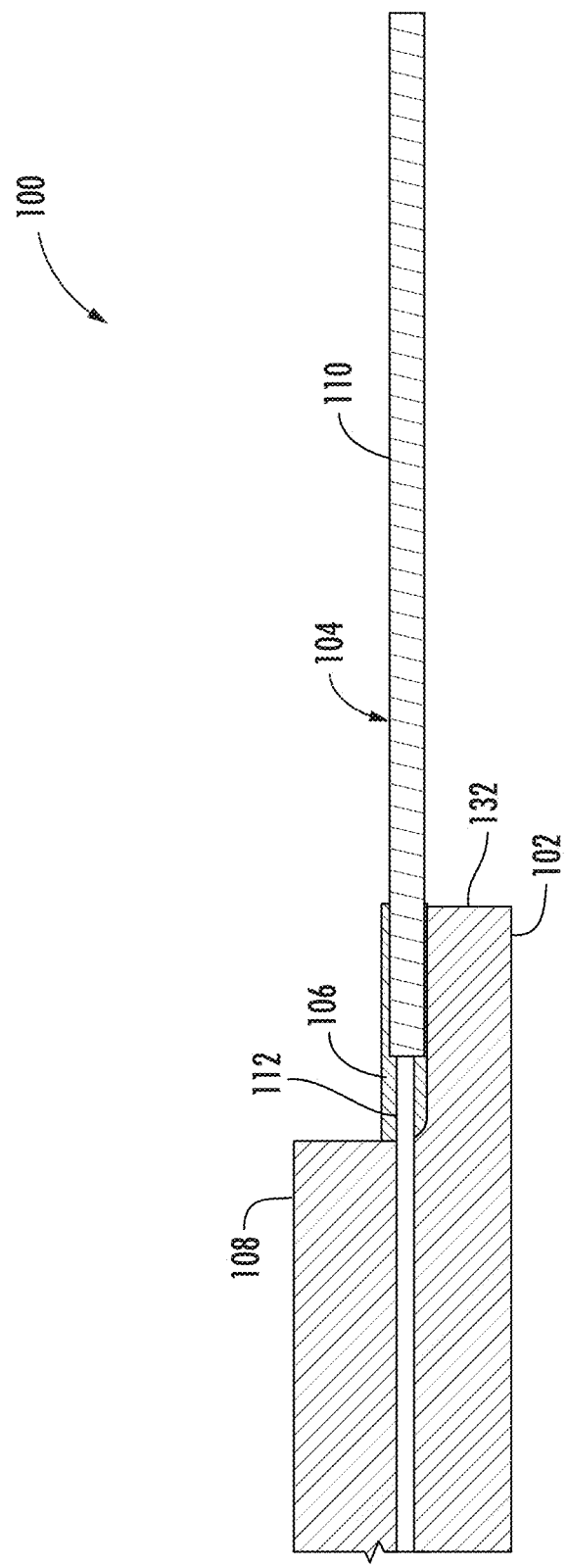
FIG. 1 is a schematic side view of a polarization maintaining fiber array.
Figure 10:
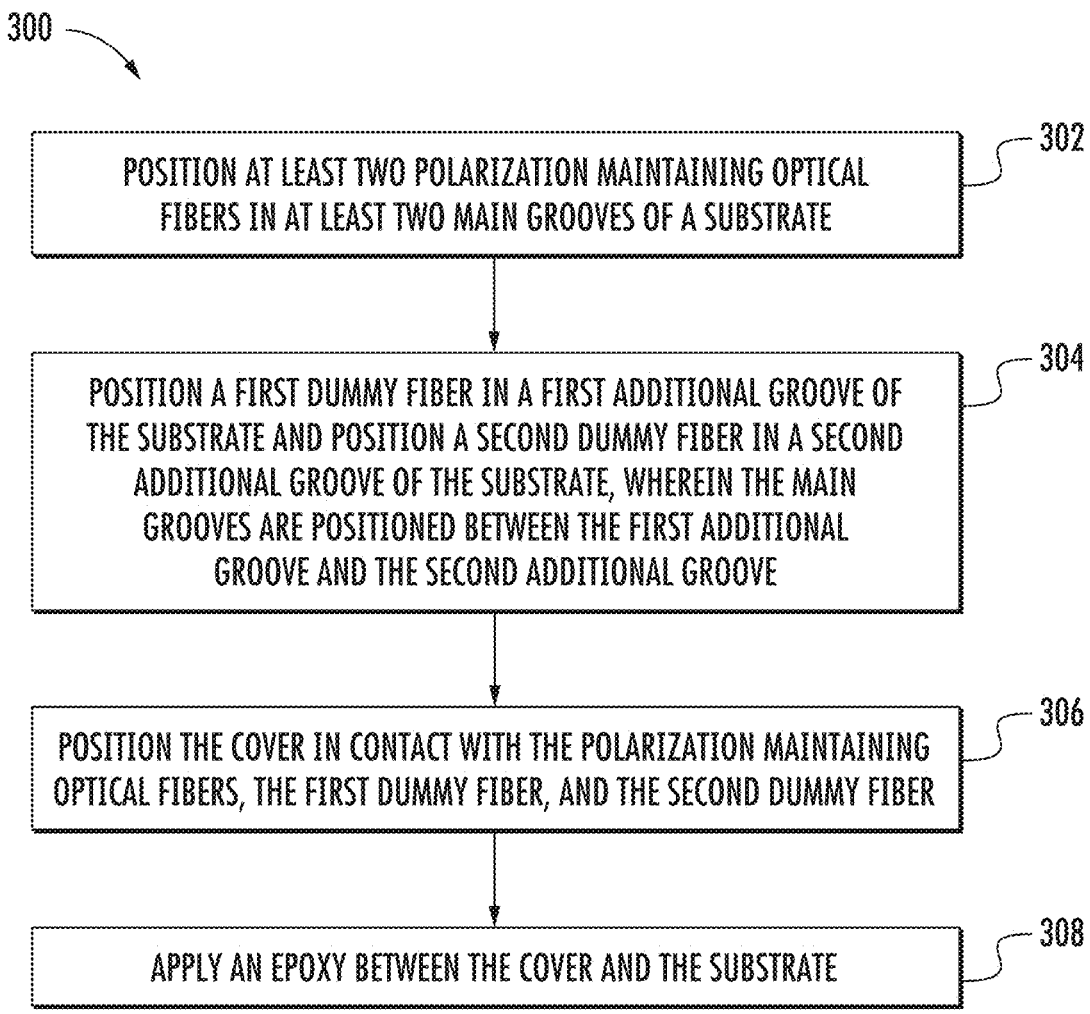
FIG. 10 is a schematic flow chart illustrating an example method of making a polarization maintaining fiber array with increased PER.

FIG. 1 is a schematic side view of an example polarization maintaining fiber array 100. The polarization maintaining fiber array 100 includes a substrate 102, two or more polarization maintaining optical fibers 104, an adhesive, such as an epoxy 106, and a cover 108. The polarization maintaining optical fibers 104 include a jacketed section 110 which includes a fiber jacket and a stripped section 112 which does not include the fiber jacket (i.e., the fiber jacket has been removed). At least a portion of the stripped section 112 is located between the substrate 102 and the cover 108 and is held in place by the substrate 102 and the cover 108. In the manufacturing process, the substrate 102 and the cover 108 maintain the positioning of the polarization maintaining optical fibers 104 until the epoxy 106 has been applied and cured. In most cases, the substrate 102 and the cover 108 continue to maintain the position of the polarization maintaining optical fibers 104 even after the epoxy 106 has been applied and cured. As illustrated in FIG. 1, the substrate 102 may include a lateral portion 132 that extends beyond the cover 108 to support the jacketed portion 110 of the polarization maintaining optical fibers 104. In FIG. 1, the epoxy 106 is applied between the substrate 102 and the cover 108 and also to the lateral portion 132 to help maintain the positioning of the jacketed portion 110 of the polarization maintaining optical fibers 104. The polarization maintaining fiber array 100 may be used in a variety of applications that require linearly polarized light propagation. For example, polarization maintaining fiber arrays 100 may be used in polarization maintaining photonic waveguide devices, planar splitters, and integrated fiber optic components.

In general, a polarization maintaining fiber array 100 includes two or more polarization maintaining fibers 104 whose polarization axes are aligned with each other. Referring now to FIG. 2, which illustrates a cross-sectional side view of the polarization maintaining fiber array 100 of FIG. 1, each polarization maintaining fiber 104 of the polarization maintaining fiber array 100 includes features to help maintain the polarization of light propagating through the fibers 104. In the embodiment illustrated in FIG. 2, for example, each polarization maintaining optical fiber 104 includes two stress rods 118 located on opposite sides of the fiber core 120 in what is known as the Panda orientation.

In order for the polarization maintaining fiber array 100 to perform its function properly, the polarization maintaining optical fibers 104 of the polarization maintaining fiber array 100 should be properly aligned. In the embodiment illustrated in FIG. 2, for example, the polarization maintaining optical fibers 104 are aligned such that the stress rods 118 of the polarization maintaining fibers 104 are aligned in a horizontal plane 134 with the cores 120 of the polarization maintaining optical fibers 104. In other embodiments, the stress rods 118 of the polarization maintaining fiber array 100 may be aligned in different orientations. For example, in some embodiments the stress rods 118 of each of the polarization maintaining optical fibers 104 are vertically oriented. In yet other embodiments, the orientation of the stress rods 118 of the polarization maintaining optical fibers 104 alternates between vertical orientation in a horizontal orientation such that a first fiber has a vertical orientation, a second fiber has a horizontal orientation, a third fiber has a vertical orientation, a fourth fiber has a horizontal orientation, and so forth. Other possible orientations of the polarization maintaining optical fibers 104 in a polarization maintaining fiber array 100 will be recognized by those of skill in the art.

In order to maintain the polarization of light in the polarization maintaining fibers 104 in a polarization maintaining fiber array 100, the polarization maintaining optical fibers 104 must be properly aligned with the light injection mechanism (not illustrated), such as a laser unit. Typically, the polarization maintaining optical fibers 104 of the polarization maintaining fiber array 100 must also be aligned with each other so that each fiber 104 is properly aligned with the light injection mechanism. Maintaining alignment of the polarization maintaining optical fibers 104 during the manufacturing process can be challenging due to the need to properly align the fibers 104 in the substrate 102 and then maintain the alignment throughout the remainder of the manufacturing process. It may be difficult to accomplish the desired output tolerances for a polarization maintaining fiber array 100 if the fiber alignment is not maintained throughout the manufacturing process. In some cases, slight misalignment between the polarization maintaining fibers 104 of a polarization maintaining fiber array 100 may cause decreased the polarization extinction ratio (PER) of the polarization maintaining fibers 104 to the point that the fiber array 100 is no longer useful for a particular application. Polarization extinction ratio (PER), as the term is used herein, means the ratio of two optical power levels of a digital signal generated by an optical source, e.g., a laser diode, and measured after a rotating polarizer. The extinction ratio may be expressed as a fraction in dB and is given by the following equation: $PER = 10 \times \log(P_{max}/P_{min})$, where $P_{max}$ is maximum power and $P_{min}$ is minimum power in each polarizer rotation cycle. PER is measured by coupling a signal from a highly polarized light source via a FC-FC jumper to the fiber array to be tested and measuring the fiber array output using a Santec PEM-330 PER meter. In general, a high PER for a polarization maintaining optical fiber used in telecommunications or data center applications is considered to be 30 dB or greater.

In the embodiment illustrated in FIG. 2, the polarization maintaining fiber array 100 includes three polarization maintaining optical fibers 104: a first polarization maintaining optical fiber 136, a second polarization maintaining optical fiber 138, and a third polarization maintaining optical fiber 140. As illustrated, the second polarization maintaining optical fiber 138 is located between the first and third polarization maintaining optical fibers 136, 140. Each of the three polarization maintaining optical fibers 136, 138, 140 is located in a main groove 122 of the substrate 102. The main grooves 122 may be evenly spaced in the substrate 102 such that the fiber cores 120 are separated by a pitch 142. The pitch 142 of the fibers 136, 138, 140 may vary by application.

As noted above, the alignment of the polarization maintaining optical fibers 104 can be measured as PER. Example PER measurements for ten sample polarization maintaining fiber arrays having the structure illustrated in FIG. 2 (i.e., a substrate 102, a cover 108, and three polarization maintaining optical fibers 104) are shown below. In the chart below, the first polarization maintaining optical fiber 136 is designated as channel 1 or "CH1", the second polarization maintaining optical fiber 138 is designated as channel 2 or "CH2", and the third polarization maintaining optical fiber 140 is designated as channel 3 or "CH3".

| PER of PM FAU of FIG. 2 | | |
|---|---|---|
| Sample | Channel | PER (dB) |
| 1 | CH1 | 26.5 |
|   | CH2 | 30.1 |
|   | CH3 | 26 |
| 2 | CH1 | 25.4 |
|   | CH2 | 29.4 |
|   | CH3 | 25.3 |
| 3 | CH1 | 28 |
|   | CH2 | 29.1 |
|   | CH3 | 26.8 |
| 4 | CH1 | 27.3 |
|   | CH2 | 24.9 |
|   | CH3 | 23 |
| 5 | CH1 | 24.4 |
|   | CH2 | 28.4 |
|   | CH3 | 23.2 |
| 6 | CH1 | 26 |
|   | CH2 | 19.8 |
|   | CH3 | 19.6 |
| 7 | CH1 | 22.3 |
|   | CH2 | 26.6 |
|   | CH3 | 27.3 |
| 8 | CH1 | 28.5 |
|   | CH2 | 20.8 |
|   | CH3 | 28.1 |
| 9 | CH1 | 22.9 |
|   | CH2 | 25.2 |
|   | CH3 | 27.2 |
| 10 | CH1 | 25.2 |
|   | CH2 | 25 |
|   | CH3 | 27.2 |

As shown in the chart above, the PER of the first and third polarization maintaining optical fibers 136, 140 (also called the first PER and the third PER) is typically lower than the PER of the second polarization maintaining optical fiber 138 (also called the second PER). It has been found that forces applied to the outer polarization maintaining optical fibers (i.e., the first and third polarization maintaining optical fibers 136, 140) during the manufacturing process may cause these fibers 136, 140 to shift slightly, thereby causing a slight misalignment and slightly lower PER. For example, forces applied by the cover 108 may cause slight misalignment in the outer polarization maintaining optical fibers 136, 140 that are not present (or are less prevalent) for the middle polarization maintaining optical fiber (i.e., the second polarization maintaining optical fiber 138). In addition, forces encountered during curing of the epoxy 106 may be different for the outer polarization maintaining optical fibers 136, 140 than for the middle polarization maintaining optical fiber 138.

FIG. 3 illustrates an example embodiment of a polarization maintaining fiber array 200 with increased PER. The polarization maintaining fiber array 200 includes a substrate 202 that has at least two main grooves 222, a first additional groove 224, and a second additional groove 226. The main grooves 222 are located between the first additional groove 224 and the second additional groove 226. As discussed in more detail below, the polarization maintaining fiber array 200 includes first and second dummy fibers 228, 230 located in the first and second additional grooves 224, 226, respectively, which alleviate forces on the polarization maintaining optical fibers 204 in the main grooves 222 during the manufacturing process. Thus, the PER for the outer polarization maintaining optical fibers (e.g., the first and third polarization maintaining optical fibers 236, 238, 240) is increased compared with arrays that do not include the first and second additional grooves 224, 226 and the first and second dummy fibers 228, 230 (see, e.g., polarization maintaining fiber array 100, and additional discussion below regarding "second polarization maintaining fiber array"). In addition, as discussed in more detail below, the PER of the middle polarization maintaining optical fiber or fibers (e.g., the second polarization maintaining optical fiber 238) is also increased compared with arrays (see e.g., polarization maintaining fiber array 100) that do not include the first and second additional grooves 224, 226 and the first and second dummy fibers 228, 230.

Referring again to FIG. 3, the substrate 202 includes at least two main grooves 222 configured to hold polarization maintaining optical fibers 204. In some embodiments, the substrate 202 may include more than two main grooves 222. For example, in the embodiment illustrated in FIG. 3, the substrate 202 includes three main grooves 222: a first main groove 250, a second main groove 252 and a third main groove 254. The substrate 202 may include additional main grooves 222 depending on the number of channels or polarization maintaining optical fibers 204 required for the array 200. The main grooves 222 are positioned between the first additional groove 224 and the second additional groove 226.

The main grooves 222 may be evenly spaced in the substrate 202 such that the fiber cores 220 of the polarization maintaining optical fibers 204 are separated by a pitch 242. The pitch 242 of the fibers 204 may vary by application.

In some embodiments, the main grooves 222 are V-grooves such that they have linear sides 244, 246 that form a generally v-shape. As used herein, the term "V-groove" means a groove or channel in the substrate 202 that has two linear portions 244, 246 that form a generally v-shape. The V-grooves may also include a rounded base 248 at the intersection of the two linear portions 244, 246, as illustrated in FIG. 3. In other embodiments, the main grooves 222 may have other shapes. For example, in some embodiments, the main grooves 222 may have a cylindrical or rectangular cross-sectional shape (not shown).

The substrate 202 also includes at least two additional grooves 224, 226 for holding dummy fibers 228, 230. For example, in the embodiment illustrated in FIG. 3, the substrate 202 includes a first additional groove 224 and a second additional groove 226 for holding first and second dummy fibers 228, 230, respectively. The substrate 202 may include more additional grooves 224, 226 depending on the number of dummy fibers 228, 230 that are to be used with the polarization maintaining fiber array 200. The additional grooves 224, 226 are disposed on either side of the main grooves 222.

The dummy grooves 224, 226 may be evenly spaced in the substrate 202 at the same pitch 242 as the main grooves 222. Alternatively, in some embodiments, the dummy grooves 224, 226 are spaced at a different distance or pitch from the main grooves 222. The pitch 242 of the dummy grooves 224, 226 may vary by application.

In some embodiments, the dummy grooves 224, 226 are V-grooves such that they have linear sides 276, 278 that form a generally V-shape. As noted above with respect to the main grooves 222, the dummy grooves 224, 226 may also include a rounded base 280 at the intersection of the two linear portions 276, 278, as illustrated in FIG. 3. In other embodiments, the dummy grooves 224, 226 may have other shapes. For example, in some embodiments, the dummy grooves 224, 226 have a cylindrical or rectangular cross-sectional shape. The dummy grooves 224, 226 may have the same shape as the main grooves 222 or a different shape than the main grooves 222.

As illustrated in FIG. 3, the main grooves 222 have a main groove angle 266 (also called a first V-groove angle) and a main groove depth 270 (also called a first V-groove depth) and the additional grooves 224, 226 have an additional groove angle 268 (also called a second V-groove angle) and an additional groove depth 272 (also called a second V-groove depth). In the embodiment illustrated in FIG. 3, the main grooves 222 each have the same main groove angle 266 and main groove depth 270, but in other embodiments the main grooves 222 may each have different main groove angles 266, different main groove depths 270, or both different main groove angles 266 and different main groove depths 270. Likewise, in the embodiment illustrated in FIG. 3, the first and second additional grooves 224, 226 have the same additional groove angle 268 and additional groove depth 272. However, in other embodiments the first and second additional grooves 224, 226 may have different additional groove angles 268, different additional groove depths 272, or both different additional groove angles 268 and different additional groove depths 272. Likewise, the main groove angle 266 may be the same as or different than the additional groove angle 268, and the main groove depth 270 may be the same as or different than the additional groove depth 272. In some embodiments, the main groove angle 266 and the additional groove angle 268 are between about 60 and about 90 degrees.

Referring again to FIG. 3, at least two polarization maintaining optical fibers 204 are positioned in the at least two main grooves 222 of the substrate 202. More specifically, in the embodiment illustrated in FIG. 3, the polarization maintaining array 200 includes a first polarization maintaining optical fiber 236 located in the first main groove 250, a second polarization maintaining optical fiber 238 located in the second main groove 252, and a third polarization maintaining optical fiber 240 located in the third main groove 254.

The polarization maintaining optical fibers 204 each include features to help maintain the polarization of light propagating through the fibers 204. In the embodiment illustrated in FIG. 3, each polarization maintaining optical fiber 204 includes two stress rods 218 located on opposite sides of the fiber core 220 in what is known as the Panda orientation. However, the disclosure is not limited to this type of polarization maintaining optical fiber 204 and other types of polarization maintaining optical fibers may be used. For example, polarization maintaining optical fibers 204 having a bow-tie configuration, elliptical-clad configuration, or other orientations may also be used.

The polarization maintaining optical fibers 204 are aligned such that the stress rods 218 of each polarization maintaining fiber 204 are aligned in a horizontal plane 234 with the cores 220 of the polarization maintaining optical fibers 204. In other embodiments, the stress rods 218 of the polarization maintaining fibers 204 may be aligned in different orientations. For example, in some embodiments the stress rods 218 of each of the polarization maintaining optical fibers 204 are vertically oriented, as illustrated in FIG. 5. In yet other embodiments, the orientation of the stress rods 218 of the polarization maintaining optical fibers 204 alternates between vertical orientation in a horizontal orientation, as illustrated in FIG. 6. Thus, in FIG. 6, the first polarization maintaining optical fiber 236 has a horizontal orientation, the second polarization maintaining optical fiber 238 has a vertical orientation, and the third polarization maintaining optical fiber 240 has a horizontal orientation. Other possible orientations of the polarization maintaining optical fibers in the polarization maintaining fiber array will be recognized by those of skill in the art.

Referring again to FIG. 3, the polarization maintaining fiber array 200 also includes two or more dummy fibers 228, 230. In the embodiment illustrated in FIG. 3, for example, the fiber array includes a first dummy fiber 228 positioned in the first additional groove 224 and a second dummy fiber 230 positioned in the second additional groove 226. As used herein, the term "dummy fiber" means any type of cylindrical object that is placed within the first or second additional grooves 224, 226 and does not transmit an optical sign. The term "dummy fiber" includes, by way of example, additional polarization maintaining optical fibers that do not transmit an optical signal, other types of optical fibers or waveguides that are not polarization maintaining optical fibers and do not transmit an optical signal, or any other cylindrical object, such as, for example, a plastic or metal rod. As used herein, the term "waveguide" means any medium for propagating light signals. In the example embodiment illustrated in FIG. 3, the first and second dummy fibers 228, 230 are additional polarization maintaining optical fibers. In the example embodiment illustrated in FIG. 4, the first and second dummy fibers 228, 230 are single mode optical fibers that are not polarization maintaining optical fibers. In the example embodiment illustrated in FIG. 5, the first and second dummy fibers 228, 230 are metal or plastic rods. And in the example embodiment illustrated in FIG. 6, the first and second dummy fibers 228, 230 are waveguides.

Referring again to FIG. 3, in some embodiments the polarization-maintaining optical fibers 204, the first dummy fiber 228, and the second dummy fiber 230 each have the same outer diameter. In other embodiments, the polarization maintaining optical fibers 204 have a first outer diameter that is different than a second outer diameter of the first and second dummy fibers 228, 230. For example, in the embodiment illustrated in FIGS. 3-6, the polarization-maintaining optical fibers 204, the first dummy fiber 228, and the second dummy fiber 230 each have the same outer diameter. In FIGS. 7-9, however, the polarization maintaining optical fibers 204 have a first outer diameter and the first and second dummy fibers 228, 230 have a second outer diameter, and the first outer diameter is different than the second outer diameter.

Referring again to FIG. 3, the polarization maintaining fiber array also includes a cover 208 that is positioned such that the polarization maintaining optical fibers 204, the first dummy fiber 228, and the second dummy fiber 230 are located between the substrate 202 and the cover 208. As noted above, the cover 208 helps to maintain the position and orientation of the polarization maintaining optical fibers 204 in the polarization maintaining fiber array 200.

The dummy fibers 228, 230 may have the same length as the polarization maintaining optical fibers 204 or a different length than the polarization maintaining optical fibers 204. For example, in some embodiments the dummy fibers 228, 230 extend the length of the additional V-grooves 224, 226 but do not extend beyond the V-grooves 224, 226 while the polarization maintaining optical fibers 204 extend beyond the V-grooves 222.

As illustrated in FIG. 3, the polarization maintaining optical fibers 204, the first dummy fiber 228, and the second dummy fiber 230 each contact the cover 208 and are held in place within the main grooves 222 and first and second additional grooves 224, 226, respectively, by the cover 208 during the manufacturing process. In order for each of the polarization maintaining optical fibers 204, the first dummy fiber 228, and the second dummy fiber 230 to each contact the cover 208, in some embodiments respective outer surfaces of the polarization maintaining optical fibers 204, the first dummy fiber 228, and the second dummy fiber 230 each protrude the same distance 264 above a top planar surface 274 of the substrate 202. Referring to FIG. 3, for example, the polarization maintaining optical fibers 204, the first dummy fiber 228, and the second dummy fiber 230 each protrude the same distance 264 above the top planar surface 274 of the substrate 202. The distance 274 is also approximately the same as a distance between the cover 208 and the top planar surface 274 of the substrate 202 so that the cover 208 contacts the polarization maintaining optical fibers 204, the first dummy fiber 228, and the second dummy fiber 230.

Referring now to FIG. 7, an embodiment is illustrated in which the main grooves 222 have a main groove angle 266 (also called a first V-groove angle) and the first and second additional grooves 224, 226 have an additional groove angle 268 (also called a second V-groove angle) that is different than the main groove angle 266. In such embodiments, the polarization maintaining optical fibers 204 may also have a first outer diameter that is different from a second outer diameter of the first and second dummy fibers 228, 230. More specifically, in the embodiment illustrated in FIG. 7, the first outer diameter of the polarization maintaining optical fibers 222 is smaller than the second outer diameter of the first and second dummy fibers 228, 230. The cover 208 still contacts the polarization maintaining optical fibers 204, the first dummy fiber 228, and the second dummy fiber 230 to hold the fibers 204, 228, 230 in place. In addition, the polarization maintaining optical fibers 204, the first dummy fiber 228, and the second dummy fiber 230 each protrude a same distance 264 from the top planar surface 274 of the substrate 202.

Referring now to FIG. 8, an embodiment is illustrated in which the main grooves 222 have a first V-groove depth 270 and the first and second additional grooves 224, 226 have a second V-groove depth 272 that is different than the first V-groove depth 270. In such embodiments, the polarization maintaining optical fibers 204 may also have a first outer diameter that is different from a second outer diameter of the first and second dummy fibers 228, 230. In the embodiment illustrated in FIG. 8, for example, the first outer diameter of the polarization maintaining optical fibers 204 is greater than the second outer diameter of the dummy fibers 228, 230. The cover 208 contacts the polarization maintaining optical fibers 204, the first dummy fiber 228, and the second dummy fiber 230 to hold the fibers 204, 228, 230 in place. In addition, the polarization maintaining optical fibers 204, the first dummy fiber 228, and the second dummy fiber 230 each protrude a same distance 264 from the top planar surface 274 of the substrate 202.

Referring now to FIG. 9, an embodiment is illustrated in which the main grooves 222 and the first and second additional grooves 224, 226 have different the groove depths 270, 272 and different groove angles 266, 268. As such, the main grooves 222 have a main groove depth 270 that is different than the additional groove depth 272 of the first and second additional grooves 224, 226, and the main grooves 222 have a main groove angle 266 that is different than the additional groove angle 268 of the first and second additional grooves 224, 226. In such embodiments, the polarization maintaining optical fibers 204 may also have a first outer diameter that is different from the second outer diameter of the first and second dummy fibers 228, 230. In the embodiment illustrated in FIG. 9, for example, the first outer diameter of the polarization maintaining optical fibers 204 is smaller than a second outer diameter of the dummy fibers 228, 230. The cover 208 contacts the polarization maintaining optical fibers 204, the first dummy fiber 228, and the second dummy fiber 230 to hold the fibers 204, 228, 230 in place. In addition, the polarization maintaining optical fibers 204, the first dummy fiber 228, and the second dummy fiber 230 each protrude a same distance 264 from the top planar surface 274 of the substrate 202.

In FIGS. 3-9, an epoxy 206 may also be applied between the cover 208 and the substrate 202 to hold the polarization maintaining optical fibers 204 and the dummy fibers 228, 230 in place during and after the manufacturing process.

To increase the PER of the polarization maintaining fiber array 200, the forces applied by the cover 208 and epoxy 206 to the polarization maintaining optical fibers 204 are shared by the dummy fibers 228, 230. As noted above, the outer polarization maintaining optical fibers (e.g., the first and third polarization maintaining optical fibers 236, 240) in a fiber array 200 may experience different forces than the inner polarization maintaining optical fibers (e.g., the second polarization maintaining optical fiber 238). By placing the first and second dummy fibers 228, 230 in the additional grooves 224, 226 as the outermost fibers of the fiber array 200, these forces are shared by the dummy fibers 228, 230. Thus, any additional forces applied to the outer fibers in the array 200 are experienced by the dummy fibers 228, 230 rather than the polarization maintaining optical fibers 204. Thus, the PER of the polarization maintaining optical fibers 204 is increased.

The chart below illustrates the PER for the polarization maintaining optical fibers 204 of ten sample polarization maintaining fiber arrays 200 (also called a "PM FA") with dummy fibers 228, 230 as illustrated in FIGS. 3-9 compared with the PER for polarization maintaining optical fibers in a polarization maintaining fiber array without dummy fibers such as the fiber array 100 of FIG. 2 (also called a "second polarization maintaining fiber array"). Each polarization maintaining fiber array tested included three polarization maintaining optical fibers designed as CH1, CH2, and CH3, respectively.

As shown in the chart, the PER for the first polarization maintaining optical fibers (i.e., CH1) increased by an average of 4.4 dB in the polarization maintaining fiber array 200 with dummy fibers compared with the first polarization maintaining fiber array 100 without dummy fibers, the PER for the second polarization maintaining optical fibers (i.e., CH2) increased by an average of 5.37 dB in the polarization maintaining fiber array 200 with dummy fibers compared with the first polarization maintaining fiber array 100 without dummy fibers, and the PER for the third polarization maintaining optical fibers (i.e., CH3) increases by an average of 4.8 dB in the polarization maintaining fiber array 200 with dummy fibers compared with the first polarization maintaining fiber array 100 without dummy fibers. In general, a second PER of the second polarization maintaining optical fiber (e.g., polarization maintaining optical fiber 238) is greater than a first PER of the first polarization maintaining optical fiber (e.g., polarization maintaining optical fiber 236) and a third PER of the third polarization maintaining optical fiber (e.g., polarization maintaining optical fiber 240). In the polarization maintaining fiber array 200 with dummy fibers, the first and third PER of the first and third polarization maintaining fibers (e.g., CH1 and CH2; polarization maintaining optical fibers 236 and 240) are greater than about 27 dB and the second PER of the second polarization maintaining optical fiber (e.g., CH2; polarization maintaining optical fiber 238) is greater than about 28 dB. In most of the samples tested of polarization fiber array unit 200 with dummy fibers, a second PER of the second polarization maintaining optical fiber (e.g., CH2; polarization maintaining optical fiber 238) is greater than about 30 dB. Also, the PER of the first, second, and third polarization maintaining optical fibers (e.g., CH1, CH2, and CH3; polarization maintaining optical fibers 236, 238, 240) of the fiber array unit 200 with dummy fibers is, in general, at least 1 dB greater than the PER of the first, second, and third polarization maintaining optical fibers (e.g., CH1, CH2, and CH3; polarization maintaining optical fibers 136, 138, 140) of the polarization maintaining fiber array unit 100 without dummy fibers.

| Sample | Channel | PER (dB) |
|---|---|---|
| PER of PM FA with Dummy Fibers (e.g., FIGS. 3-9) | | |
| 1 | CH1 | 32.1 |
|   | CH2 | 29.5 |
|   | CH3 | 27 |
| 2 | CH1 | 29.3 |
|   | CH2 | 32.2 |
|   | CH3 | 33.1 |
| 3 | CH1 | 25.3 |
|   | CH2 | 34.2 |
|   | CH3 | 27.1 |
| 4 | CH1 | 28.4 |
|   | CH2 | 34.2 |
|   | CH3 | 33.1 |
| 5 | CH1 | 30.3 |
|   | CH2 | 31.4 |
|   | CH3 | 28.5 |
| 6 | CH1 | 29.8 |
|   | CH2 | 28.6 |
|   | CH3 | 32.5 |
| 7 | CH1 | 34.2 |
|   | CH2 | 29.3 |
|   | CH3 | 29 |
| 8 | CH1 | 29.8 |
|   | CH2 | 33.7 |
|   | CH3 | 30.2 |
| 9 | CH1 | 30.2 |
|   | CH2 | 31.7 |
|   | CH3 | 29.5 |
| 10 | CH1 | 31.5 |
|   | CH2 | 28.2 |
|   | CH3 | 31.7 |
| PER of PM FA Without Dummy Fibers (e.g., FIG. 2) | | |

-continued

| Sample | Channel | PER (dB) |
|---|---|---|
| 1 | CH1 | 26.5 |
|   | CH2 | 30.1 |
|   | CH3 | 26 |
| 2 | CH1 | 25.4 |
|   | CH2 | 29.4 |
|   | CH3 | 25.3 |
| 3 | CH1 | 28 |
|   | CH2 | 29.1 |
|   | CH3 | 26.8 |
| 4 | CH1 | 27.3 |
|   | CH2 | 24.9 |
|   | CH3 | 23 |
| 5 | CH1 | 24.4 |
|   | CH2 | 28.4 |
|   | CH3 | 23.2 |
| 6 | CH1 | 26 |
|   | CH2 | 19.8 |
|   | CH3 | 19.6 |
| 7 | CH1 | 22.3 |
|   | CH2 | 26.6 |
|   | CH3 | 27.3 |
| 8 | CH1 | 28.5 |
|   | CH2 | 20.8 |
|   | CH3 | 28.1 |
| 9 | CH1 | 22.9 |
|   | CH2 | 25.2 |
|   | CH3 | 27.2 |
| 10 | CH1 | 25.2 |
|   | CH2 | 25 |
|   | CH3 | 27.2 |

During the manufacturing process of the polarization maintaining fiber array unit 200, the polarization maintaining optical fibers 204 are placed in the main grooves 222 and then aligned so that the stress rods 218 of the polarization maintaining optical fibers 222 are oriented as desired. In the embodiment illustrated in FIG. 3, for example, the stress rods 218 are aligned along a horizontal axis 234 with the cores 220 of the polarization maintaining optical fibers 204. The dummy fibers 228, 230 are placed within the additional grooves 224, 226 of the substrate 202. An epoxy 206 is placed within the main grooves 222 and the first and second additional grooves 224, 226, and the cover 208 is positioned such that the polarization maintaining optical fibers 204 and the dummy fibers 228, 230 are held between the cover 208 and the substrate 202. Sufficient epoxy 206 may be applied to file a majority of the space between the cover 208 and the substrate 202. As the epoxy 206 cures, the polarization maintaining optical fibers 204 and the dummy fibers 228 experience forces based on the rate of epoxy curing, the volume of epoxy within the fiber array, thermal expansion/contraction of the various parts of the array 200, the positioning of the polarization maintaining optical fibers 204 and the dummy fibers 228, 230, and the pressure applied to the polarization maintaining optical fibers 204 and the dummy fibers 228, 230 by the cover 208 and the substrate 202, among other causes. The forces experienced by the polarization maintaining optical fibers 204 and the dummy fibers 228, 230 can cause the polarization maintaining optical fibers 204 to deviate slightly from the oriented positioning. Such a deviation in the orientation of the stress rods 218 of the polarization maintaining optical fibers 204 may cause a lower PER value which may or may not fall within the specifications required for the polarization maintaining fiber array. Placement of the dummy fibers 228, 230 in the first and second additional grooves 224, 226 has been found to increase the PER of the polarization maintaining optical fibers 204 compared with polarization fiber arrays that do not use the dummy fibers 228, 230 (e.g., the polarization fiber array 100 in FIG. 2).

FIG. 9 illustrates a method 300 of manufacturing a polarization maintaining fiber array 200. The method 300 includes positioning at least two polarization maintaining optical fibers 204 in the at least two main grooves 222 of a substrate 202, as illustrated at block 302. The method 300 also includes positioning a first dummy fiber 228 in a first additional groove 224 of the substrate 202 and positioning a second dummy fiber 230 in a second additional groove 226 of the substrate 202, wherein the main grooves 222 are positioned between the first additional groove 224 and the second additional groove 226, as illustrated at block 304. The method 300 also includes positioning the cover 208 in contact with the polarization maintaining optical fibers 204, the first dummy fiber 228, and the second dummy fiber 230, as illustrated at block 306. An epoxy 206 is applied between the cover 208 and the substrate 202, illustrated at block 208. In some embodiments, the epoxy 206 is cured after the cover 208 is positioned such that the cover 208 contacts at least polarization maintaining optical fibers 204, the first dummy fiber 228, and the second dummy fiber 230.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A polarization maintaining fiber array, comprising:
   a substrate comprising at least two main grooves, a first additional groove, and a second additional groove, wherein the at least two main grooves are positioned between the first additional groove and the second additional groove;
   at least two polarization maintaining optical fibers positioned in the at least two main grooves;
   a first dummy fiber positioned in the first additional groove;
   a second dummy fiber positioned in the second additional groove; and
   a cover positioned such that the cover contacts the at least two polarization maintaining optical fibers, the first dummy fiber, and the second dummy fiber.

2. The polarization maintaining fiber array according to claim 1, wherein the at least two polarization-maintaining optical fibers, the first dummy fiber, and the second dummy fiber have a same outer diameter.

3. The polarization maintaining fiber array according to claim 1, wherein the at least two polarization maintaining optical fibers have a first outer diameter and the first and second dummy fibers have a second outer diameter, and wherein the first outer diameter is different than the second outer diameter.

4. The polarization maintaining fiber array according to claim 1, wherein the first dummy fiber and the second dummy fiber are single mode optical fibers.

5. The polarization maintaining fiber array according to claim 1, wherein the first dummy fiber and the second dummy fiber are additional polarization maintaining optical fibers.

6. The polarization maintaining fiber array according to claim 1, further comprising an adhesive positioned between the cover and the substrate.

7. The polarization maintaining fiber array according to claim 1, wherein the at least two main grooves and the first and second additional grooves are V-grooves, and the at least two main grooves and the first and second additional grooves each have a same V-groove angle.

8. The polarization maintaining fiber array according to claim 7, wherein the V-groove angle of the at least two main grooves and the first and second additional grooves is between about 60 and about 90 degrees.

9. The polarization maintaining fiber array according to claim 7, wherein the at least two main grooves and the first and second additional grooves have a same V-groove depth.

10. The polarization maintaining fiber array according to claim 1, wherein the at least two main grooves and the first and second additional grooves are V-grooves, and the at least two main grooves each have a first V-groove angle and the first and second additional grooves each have a second V-groove angle, wherein the first V-groove angle is different than the second V-groove angle.

11. The polarization maintaining fiber array according to claim 10, wherein the at least two main grooves each have a first V-groove depth and the first and second additional grooves each have a second V-groove depth, and wherein the first V-groove depth is different than the second V-groove depth.

12. The polarization maintaining fiber array according to claim 1, wherein the substrate comprises a planar surface, and wherein respective outer surfaces of the at least two polarization maintaining optical fibers, the first dummy fiber, and the second dummy fiber each protrude a same distance from the planar substrate.

13. The polarization maintaining fiber array according to claim 1, wherein the at least two polarization maintaining optical fibers comprise a first polarization maintaining optical fiber having a first polarization extinction ratio (PER), a second polarization maintaining optical fiber having a second PER, and a third polarization maintaining optical fiber having a third PER, wherein the second polarization maintaining optical fiber is positioned between the first and third polarization maintaining optical fibers, wherein the second PER is greater than both the first PER and the third PER.

14. The polarization maintaining fiber array according to claim 13, wherein the first PER and the third PER are each greater than about 27 dB, and the second PER is greater than about 28 dB.

15. A method of manufacturing a polarization maintaining fiber array, comprising:
    positioning at least two polarization-maintaining optical fibers in at least two main grooves of a substrate;
    positioning a first dummy fiber in a first additional groove of the substrate;
    positioning a second dummy fiber in a second additional groove of the substrate, wherein the at least two main grooves are between the first additional groove and the second additional groove;
    positioning a cover in contact with the at least two polarization maintaining optical fibers, the first dummy fiber, and the second dummy fiber.

16. The method of claim 15, further comprising applying an adhesive between the cover and the substrate.

17. The method of claim 15, further comprising curing the adhesive after the cover is in contact with the at least two polarization maintaining optical fibers, the first dummy fiber, and the second dummy fiber.

18. A polarization maintaining fiber array, comprising:
    a substrate comprising at least two main grooves, a first additional groove, and a second additional groove, wherein the at least two main grooves are positioned between the first additional groove and the second additional groove;

at least two polarization-maintaining optical fibers positioned in the at least two main grooves;

a first dummy fiber positioned in the first additional groove;

a second dummy fiber positioned in the second additional groove; and a cover in contact with the at least two polarization maintaining optical fibers, the first dummy fiber, and the second dummy fiber;

wherein a polarization extinction ratio (PER) of the at least two polarization maintaining optical fibers is greater than or equal to about 27 dB.

19. The polarization maintaining array according to claim 18, wherein the PER of the at least two polarization maintaining optical fibers is between about 27 dB and about 30 dB.

20. The polarization maintaining array according to claim 18, wherein the PER of the at least two polarization maintaining optical fibers is greater than a PER of polarization maintaining optical fibers in a second polarization maintaining fiber array without the first and second dummy fibers.

21. The polarization maintaining array according to claim 18, wherein the at least two polarization maintaining optical fibers comprise a first polarization maintaining optical fiber, a second polarization maintaining optical fiber, and a third polarization maintaining optical fiber, wherein the second polarization maintaining optical fiber is positioned between the first and third polarization maintaining optical fibers, and wherein a second PER of the second polarization maintaining optical fiber is greater than about 30 dB.

22. A polarization maintaining fiber array, comprising:
a substrate comprising at least two main grooves, a first additional groove, and a second additional groove, wherein the at least two main grooves are positioned between the first additional groove and the second additional groove;

at least two polarization-maintaining optical fibers positioned in the at least two main grooves;

a first dummy fiber positioned in the first additional groove;

a second dummy fiber positioned in the second additional groove; and a cover in contact with the at least two polarization maintaining optical fibers, the first dummy fiber, and the second dummy fiber, wherein at least a portion of each of the at least two polarization maintaining optical fibers, the first dummy fiber, and the second dummy fiber is positioned between the cover and the substrate;

wherein the first dummy fiber and the second dummy fiber are additional polarization maintaining optical fibers; and wherein a polarization extinction ratio (PER) of the at least two polarization maintaining optical fibers is greater than or equal to about 27 dB.

* * * * *